April 28, 1959  C. R. POLSTRA  2,884,260
BUMPER ATTACHMENT
Filed Jan. 19, 1956  2 Sheets-Sheet 1
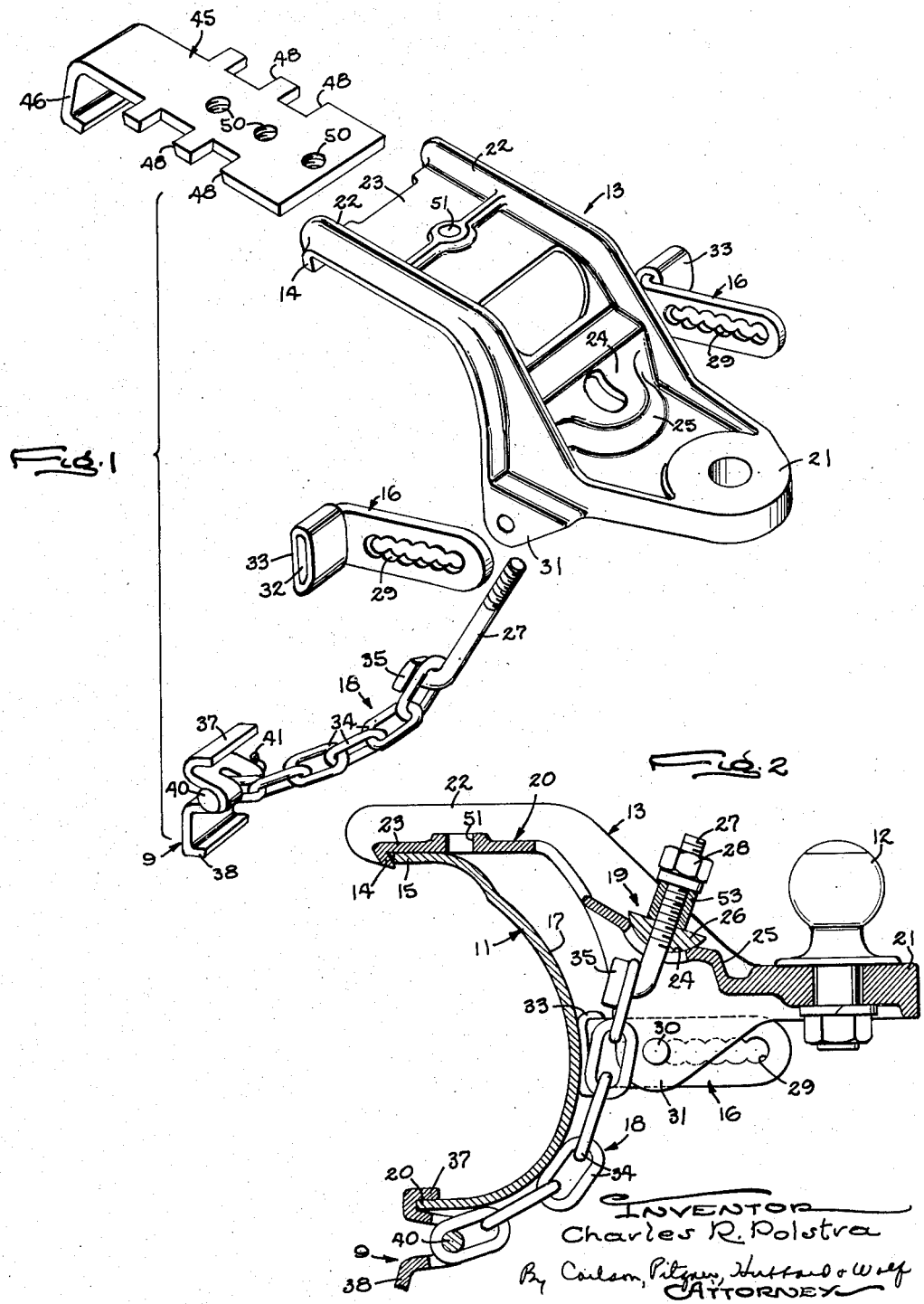
INVENTOR
Charles R. Polstra
By Carlson, Pitzner, Hubbard & Wolf
ATTORNEY

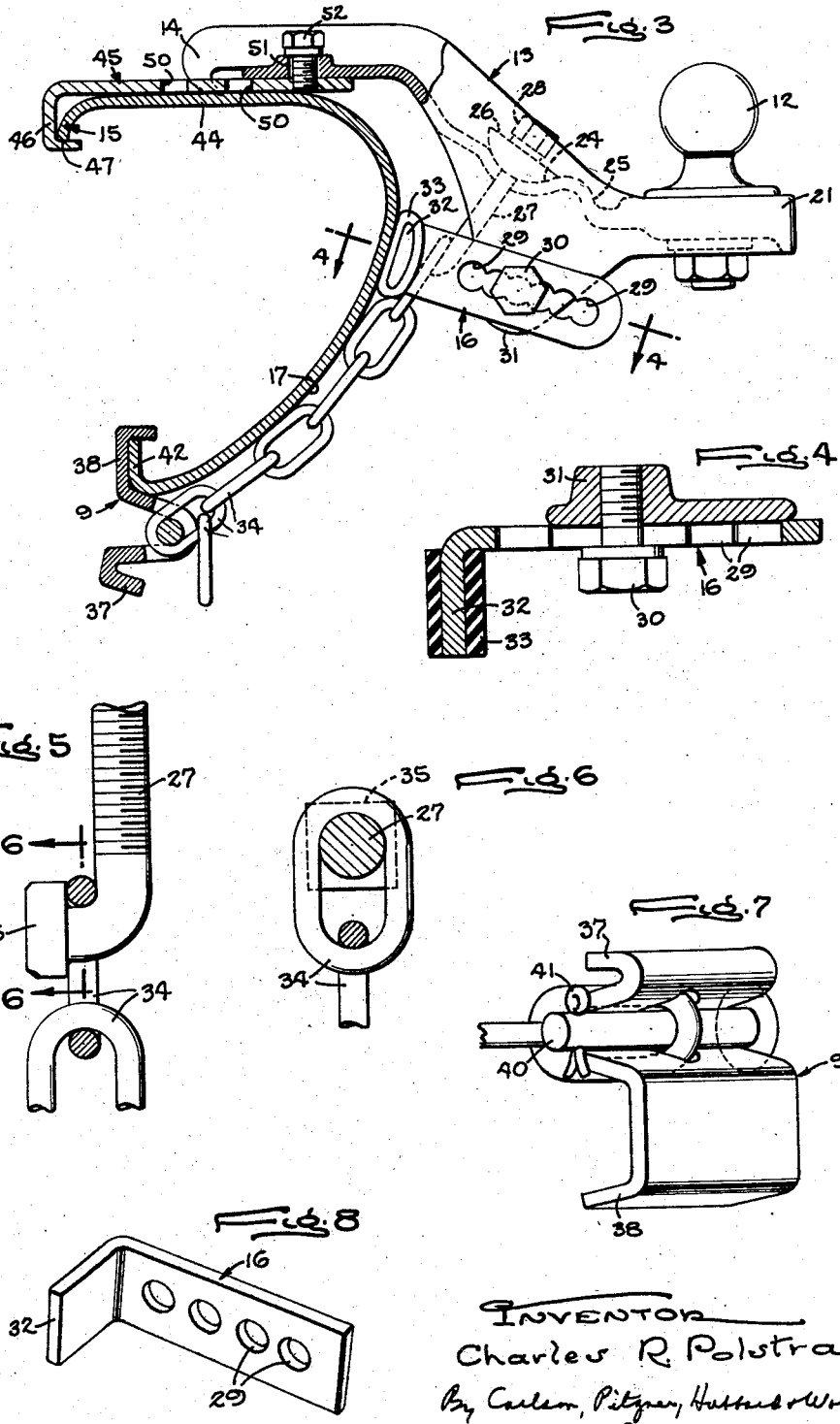

United States Patent Office 2,884,260
Patented Apr. 28, 1959

2,884,260

BUMPER ATTACHMENT

Charles R. Polstra, Rockford, Ill.

Application January 19, 1956, Serial No. 560,205

6 Claims. (Cl. 280—502)

This invention relates to an attachment carrying one element of a trailer coupling and adapted to be secured detachably to the bumper of a towing vehicle. More particularly, the invention is an improvement upon the attachment disclosed in Patent 2,542,907 and comprising a bracket hooked around one edge of the bumper and carrying an adjustable strut forming with the bracket and the bumper a rigid truss structure clamped to the bumper by a hook engaging the other bumper edge.

The general object is to provide a bumper attachment of the above character which is more versatile than the patented bumper, which avoids marring the face of the bumper to which it is attached, and which may be applied to bumpers of widely varying contours without the addition or substitution of parts.

Another object is to provide a novel construction and mounting of the connecting strut.

A further object is to clamp the attachment to the bumper through the use of a novel flexible linkage capable of adapting itself to the contour of the bumper face.

The invention also resides in the novel construction of the flexible linkage and to the manner of extending the length of the bracket in a plurality of steps.

Other objects and advantages of the invention will become apparent from the following detailed description taken in connection with the accompanying drawings, in which Figure 1 is an exploded perspective view of the improved bumper attachment.

Fig. 2 is a longitudinal sectional view through the attachment with the latter mounted on a bumper.

Fig. 3 is a side elevational view partially in section showing the attachment mounted on a bumper of a different cross-sectional shape.

Fig. 4 is a section taken along the line 4—4 of Fig. 3.

Fig. 5 is a fragmentary longitudinal sectional view through a part of the tensioned linkage.

Fig. 6 is a fragmentary sectional view taken along the line 6—6 of Fig. 5.

Fig. 7 is a fragmentary perspective view of one end portion of the flexible linkage.

Fig. 8 is a perspective view of a modified form of the strut.

In the embodiment shown for purposes of illustration, the improved bumper attachment is detachably mounted on a bumper 11 to support a coupling element such as a kingpin 12 in upright position and spaced rearwardly from the bumper. Such bumpers are usually curved in cross section and vary considerably in width, contour, and shape of the edges, typical shapes being shown in Figs. 2 and 3.

The attachment includes a generally S-shaped bracket 13 with a jaw 14 formed thereon which hooks around one edge 15 of the bumper. Carried on the bracket is a longitudinally extensible strut 16 projecting toward and abutting against the convex outer face 17 of the bumper to form with the bracket and the bumper a rigid truss structure clamped to the bumper by a linkage 18 extending from a pivot joint 19 intermediate the ends of the bracket to another jaw 9 which hooks around the other bumper edge 20. The jaw 14 is formed on one relatively straight end portion 20 of the bracket, the other substantially parallel end portion 21 being offset downwardly and projecting rearwardly from the bumper about midway between the edges thereof. The portion 21 provides a platform to which the kingpin is clamped.

In the present instance the bracket 13 is an elongated casting having laterally spaced ribs 22 along opposite side edges joined by a web 23. The jaws 14 are cast integral with the ends of the ribs 22 and inclined backwardly so as to hook around and fit securely against the unflanged upper edge of a bumper.

As in the patented attachment, the pivot joint 19 includes an arcuate seat 24 formed in a boss 25 of the connecting bracket web. A semicircular block 26 fits in the seat 24 and receives the threaded end of a bolt 27 by which the linkage 18 may be tensioned by tightening a nut 28.

In one of its aspects, the invention contemplates a novel construction of the strut 16 to achieve greater versatility in the adaptation of the attachment to bumpers of widely varying contours while always disposing the kingpin in a substantially vertical position. To this end, the strut is mounted on the bracket 13 not only for longitudinal adjustment, but also for swiveling adjustment about an axis paralleling the bumper thus enabling the strut to be projected against the bumper face and disposed normal thereto at the point of engagement irrespective of the shape of the face.

Preferably two laterally spaced struts are employed and disposed on opposite sides of the bracket. Each of a series of holes 29 spaced along each strut is adapted to receive a screw 30 threading into an ear 31 cast on the bracket and depending from one side of the bracket intermediate the ends of the latter. By selecting different ones of the holes, the effective length of each strut may be changed while permitting the strut, before tightening of the screw 30, to be swung into position substantially perpendicular to the bumper face 17. The holes 29 may overlap each other as shown in Figs. 1 to 4 to permit the length of the strut to be varied step by step without removing the screws. As an alternative, the holes may be separated from each other and spaced along the struts as shown in Fig. 8.

To provide a relatively large bearing surface for engagement with the bumper face 17, the free ends of the struts 16 are bent at right angles as indicated at 32 and preferably covered with material 33 such as firm rubber. With the struts thus constructed, the clamping pressure is distributed over a large area of the bumper face and marring of the latter is effectually avoided.

In another of its aspects, the invention contemplates the formation of the linkage 18 as a flexible element and for lengthwise adjustment in a plurality of steps so that the linkage may follow around the convex bumper face 17 and be tensioned against the lower edge 20 without the substitution of other parts and in spite of wide variations in the contour of the face in different standard bumpers. For this purpose, the linkage comprises a length of heavy chain having a plurality of interlocked links 34 a terminal one of which interengages with a hook formed on the lower end of the bolt 27. This hook comprises a right angle bend in a bolt of standard construction having a head 35 which forms an abutment for the selected link. A selected one of the links at or near the other end of the chain is detachably connected, preferably pivotally, to the lower jaw 9 which is formed with at least one hook for engaging the bumper edge 20.

Two hooks 37 and 38 are provided in the present instance at the ends of a stamping having a U-shaped bend 36 slotted as indicated at 39 to receive one looped end of a selected chain link which is coupled detachably to the jaw 9 by a headed pin 40 held in place by means such as a cotter pin 41. By making the hooks 37 and 38 of different widths, the jaw 9 may be adapted readily to bumpers with different lower edge constructions. Thus the narrow hook 37 is used in the case of an unflanged edge (Fig. 2) while the wider hook 38 may be engaged with a bumper edge having an upturned flange 42 as shown in Fig. 3.

In certain types of bumpers, the top flange 44 is made of substantial width as shown in Fig. 3. The bracket is adapted to such constructions through the use of an extension bar 45 interengageable at one end with the bracket jaws 14 and formed at its other end with an auxiliary jaw 46 adapted to be hooked around the bumper edge 15 even when the latter is flanged as indicated at 47 (Fig. 3). Herein the extension bar 45 is a flat strip of metal notched along opposite side margins and at spaced points to receive the jaws 14 and provide abutments 48 engageable with the surfaces of these jaws. By hooking the jaws 14 over different ones of the abutments 48, the effective length of the bracket may be changed to fit bumpers of different top widths. In each different length of the bracket extension, one of several threaded holes 50 registers with a hole 51 in the bracket web 23 so that the latter may be clamped rigidly to the bar by means of a cap screw 52.

To apply the improved attachment to a bumper of the character shown in Fig. 2, the jaws 14 of the bracket are hooked over and around the upper edge 15 of the bumper. The bolt 27 is projected through the swivel block 26 and, if desired, a spacer 53 and the nut 28 started onto the bolt. Then the chain is drawn down around the bumper face and the end of the nearest link 34 is inserted through the slot 39 while the hook 37 of the jaw 9 with the pin 40 removed is held against the bumper edge 20. Next the pin 40 is replaced leaving the linkage 18 hanging loosely while the bracket 13 is disposed substantially horizontally.

The struts 16 are then adjusted to the contour of the bumper face 17. This is accomplished after loosening the screws 30 by sliding the struts endwise toward the bumper to bring the widened ends 33 into full abutment with the bumper face when the struts are disposed substantially horizontally and therefore normal to this face, the kingpin then being disposed in the desired vertical position. Thereupon, the screws 30 are tightened to lock the struts to the bracket and complete the rigid triangular truss structure formed by the bracket, the struts, and the upper edge portion of the bumper. Finally, this structure is clamped securely against the bumper simply by tightening down the nut 28 thereby drawing the linkage 18 taut between the bracket and the lower bumper edge 20. By virture of its flexible character, the linkage 18 follows around the quite sharply curved lower edge portion of the bumper which is engaged by the first and third links as shown in Fig. 2 when the linkage is fully tensioned.

To adapt the attachment to a bumper of the shape shown in Fig. 3, the extension bar 55 is fitted onto the end of the bracket 23 with the jaws 14 engaging the terminal one of the abutments 48, these two parts being clamped together by tightening the screw 52 into the terminal hole 50 of the extension bar. Owing to the flanged character of the lower edge of the bumper, the wider hook 38 is selected in attaching the linkage 18 to the bumper. The spacer 53 may, in this instance be omitted. As before, the struts 16 are adjusted as to length and angularity so as to bring their ends 33 against the face of the bumper when the kingpin is in the desired vertical position. After tightening the screws with the struts inclined upwardly toward the bumper as shown in Fig. 3, the nut 28 is tightened down to tension the linkage and clamp the bracket and strut assembly firmly in place.

From a comparison of Figs. 2 and 3 it will be apparent that the improved attachment may be applied quickly and conveniently to bumpers of widely varying sectional shapes and this without the addition or substitution of other parts. At the same time, all of the parts with the exception of the bracket casting are either of standard construction or formed as simple sheet metal stampings thus enabling the entire attachment to be manufactured at low cost.

I claim as my invention:

1. A bumper attachment comprising a generally S-shaped bracket having a jaw at one end adapted to fit over and interlock with one edge of a bumper with the other end portion projecting from the outer face of the bumper and supporting an upright kingpin, an elongated strut having an end adapted to engage the bumper face, means on said bracket intermediate the ends thereof supporting said strut for angular adjustment about an axis paralleling the bumper and clamping the strut rigidly to said bracket, said supporting means also providing for endwise shifting of said strut transversely of said axis to bring said end into abutment with the bumper face, and a member adapted to be tensioned between said bracket and the other edge of said bumper and comprising a plurality of interlocked chain links.

2. A bumper attachment comprising a generally S-shaped bracket having a jaw at one end adapted to fit over and interlock with one edge of a bumper with the other end portion projecting from the convex outer face of the bumper, said projecting portion supporting an upright kingpin, an elongated strut projecting from said bracket and adapted for abutment at its one end against said bumper face, means for clamping said strut rigidly to said bracket, alternatively usable means on said strut coacting with said clamping means to vary the effective length of said strut and also its angular position relative to the bracket, and a linkage adapted to be stretched between said bracket and the other edge of said bumper to clamp said free strut end against said bumper face, said linkage having a flexible intermediate portion of selectively variable length lying in contact with and following the contour of a portion of said bumper face.

3. A bumper attachment comprising a generally S-shaped bracket having a jaw at one end adapted to fit over and interlock with one edge of a bumper, the other end portion projecting from the outer face of the bumper and supporting an upright kingpin, an elongated strut having a plurality of holes extending transversely therethrough and spaced along the strut, a means on said bracket intermediate the ends thereof extending through a selected one of said holes and supporting said strut for angular adjustment and clamping the strut rigidly to said bracket, and a member adapted to be tensioned between said bracket and the other edge of said bumper.

4. A bumper attachment comprising a generally S-shaped bracket having a jaw at one end adapted to fit over and interlock with one edge of a bumper, the other end portion projecting from the outer face of the bumper and supporting an upright kingpin, an elongated strut having an end adapted to engage the face of said bumper, means on said bracket intermediate the ends thereof supporting said strut for angular adjustment about an axis paralleling the bumper and clamping the strut rigidly to said bracket with said end in abutment with the bumper face and the strut disposed substantially perpendicular thereto, and a member adapted to be tensioned between said bracket and the other edge of said bumper.

5. A bumper attachment comprising a generally S-shaped bracket having a jaw at one end adapted to fit over and interlock with one edge of a bumper with the other end portion projecting from the convex outer face of the bumper, said projecting portion supporting an upright kingpin, an elongated strut projecting from said bracket and having a right angular projection at one end adapted for abutment with said bumper face, a pivot screw paralleling said bumper and extending through apertures in said bracket and said strut to permit swiveling of said strut and disposal thereof substantially normal to a selected point on said bumper face, at least one of said apertures providing a plurality of holes spaced along said strut for selectively receiving said screw to permit of endwise adjustment thereof relative to said bracket to bring said projection into abutment with the bumper face at said selected point, and a flexible linkage stretched between the other edge of said bumper and said bracket to compress said strut and clamp said projection against said bumper face.

6. A bumper attachment comprising a generally S-shaped bracket having a jaw at one end adapted to fit over and interlock with one edge of a bumper with the other end portion projecting from the convex outer face of the bumper, said projecting portion supporting an upright kingpin, an elongated strut projecting from said bracket and having one end adapted for abutment with said bumper face, a pivot screw paralleling said bumper and extending through apertures in said bracket and said strut to permit swiveling of said strut and disposal thereof substantially normal to a selected point on said bumper face, at least one of said apertures providing a plurality of holes spaced along said strut for selectively receiving said screw to permit of endwise adjustment thereof relative to said bracket to bring said end into abutment with the bumper face at said selected point, and a flexible linkage stretched between the other edge of said bumper and said bracket to compress said strut and clamp said projection against said bumper face.

References Cited in the file of this patent
UNITED STATES PATENTS

| | | |
|---|---|---|
| 2,458,667 | Williams | Jan. 11, 1949 |
| 2,542,907 | Dayton et al. | Feb. 20, 1951 |
| 2,693,369 | Gross | Nov. 2, 1954 |